J. R. BLOSSOM.
Baling-Press.
No. 206,658. Patented Aug. 6, 1878.
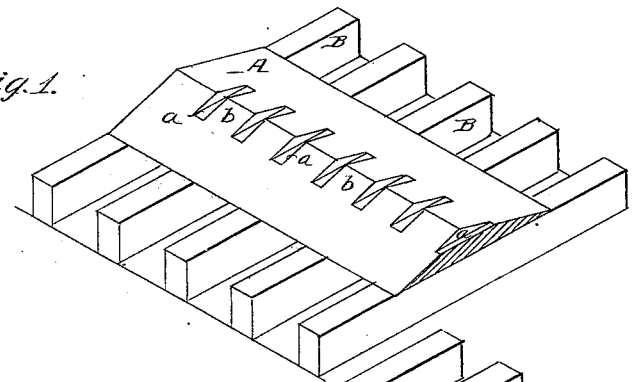
Fig. 1.
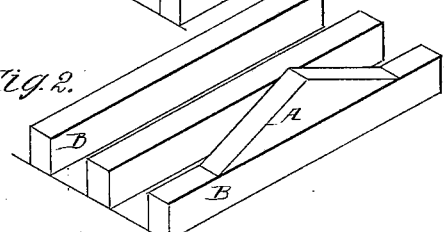
Fig. 2.
Fig. 4.
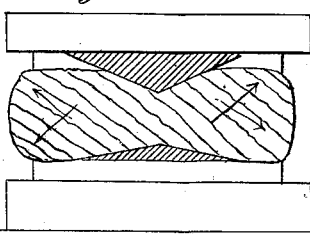
Fig. 3.
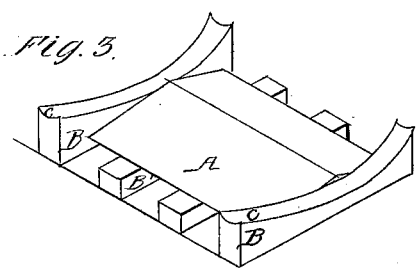
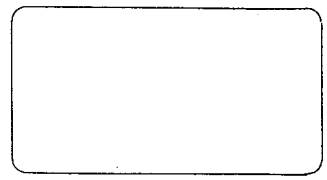
Fig. 5.  Fig. 6.
Attest:
Frank M. Green
H. Benjamin
Inventor
J. R. Blossom
By his attorney
Chas. E. Foster

UNITED STATES PATENT OFFICE.

JOSEPH R. BLOSSOM, OF BROOKLYN, NEW YORK.

IMPROVEMENT IN BALING-PRESSES.

Specification forming part of Letters Patent No. 206,658, dated August 6, 1878; application filed June 10, 1878.

*To all whom it may concern:*

Be it known that I, JOSEPH R. BLOSSOM, of Brooklyn, Kings county, New York, have invented certain Improvements in Baling-Presses, of which the following is a specification:

The object of my invention is to secure such a compression in baling cotton and other articles that the bales, while in the press, will be subjected to such pressure as will remove part of the contents from the center in the direction of the opposite corners, so that when removed from the press their faces will be nearly parallel instead of rounded, as heretofore.

In the accompanying drawing, which forms part of this specification, Figure 1 is a perspective view illustrating my improvement. Figs. 2 and 3 are modifications; Fig. 4, a view showing the operation of the press; and Figs. 5 and 6 are diagrams.

In ordinary processes of baling flat or concave bars or platens have been used, and it has been found that the bales after pressure expand to a shape in cross-section approximating that shown in Fig. 5—that is, with rounded opposite faces. This has been attributed to various causes, and efforts have been made to prevent it, but heretofore without success.

I have found that by pressing the bale so as to force the material from the center to the edges the amount at the center is reduced and the line of ultimate expansion is changed, so that the outline of the bale in cross-section on removing the pressure will be almost rectangular, as shown in Fig. 6.

Various modes of adapting the press to accomplish this result may be adopted. For instance, a triangular strip, A, may be applied to the bars B of the platen, the base of the strip resting against the faces of the bars, as shown in Fig. 1, or detachable triangular or other suitably-shaped strips A may be applied separately to the faces of some or all of the bars, as shown in Fig. 2, or the strip may be applied between the bars, whether the latter be curved or flat, as shown in Fig. 3.

The press with the strips A upon the platens is used in the ordinary manner, and the protuberant edges or centers of the strips A will compress and force the material laterally to the sides or edges, as shown in Fig. 4.

The bands are applied either between the bars B or directly upon the faces of the bars, and, if necessary, across and upon the strips A, and are fastened in any suitable manner while the bale is under pressure.

When a continuous strip, A, Fig. 1, is used, it may have slots $a$ large enough to receive the bands, the intermediate portions $b$ compressing the material without unduly bending the bands, which may also be passed through grooves $c$ in curved bars arranged with the strips A between, as shown in Fig. 3.

It will be apparent that the platen may be constructed with a longitudinal central rib or projection, A, instead of being provided with a detachable strip.

I claim—

1. A platen provided with a longitudinal central rib or projection, constructed and arranged to force the material of the bale from the middle of its width toward the sides, as set forth.

2. A platen provided with one or more strips, A, protruding at the center, and applied upon the platen plate or bars, or between the latter, substantially as and for the purpose set forth.

3. A platen provided with the protruding strip or strips A and with grooves $a$ to receive the bands, as set forth.

In testimony whereof I have signed my name to this specification in the presence of two subscribing witnesses.

JOSEPH R. BLOSSOM.

Witnesses:
J. R. BLOSSOM, Jr.,
H. S. BLOSSOM.